(12) United States Patent
Labayrade et al.

(10) Patent No.: US 11,567,004 B2
(45) Date of Patent: Jan. 31, 2023

(54) OPTICAL DEVICE FOR MEASURING THE OPTICAL PROPERTIES OF MATERIALS

(71) Applicant: ENTPE, Vaulx en Velin (FR)

(72) Inventors: Raphael Labayrade, Lyons (FR); Anna Andreani, Ajaccio (FR)

(73) Assignee: ENTPE, Vaulx en Velin (FR)

( * ) Notice: Subject to any disclaimer, the term of this patent is extended or adjusted under 35 U.S.C. 154(b) by 137 days.

(21) Appl. No.: 17/284,879

(22) PCT Filed: Oct. 22, 2019

(86) PCT No.: PCT/EP2019/078747
§ 371 (c)(1),
(2) Date: Apr. 13, 2021

(87) PCT Pub. No.: WO2020/083924
PCT Pub. Date: Apr. 30, 2020

(65) Prior Publication Data
US 2021/0389240 A1     Dec. 16, 2021

(30) Foreign Application Priority Data
Oct. 24, 2018   (FR) .................................... 1859832

(51) Int. Cl.
*G01N 21/55*   (2014.01)
*G01J 1/02*    (2006.01)
(Continued)

(52) U.S. Cl.
CPC ............ *G01N 21/55* (2013.01); *G01J 1/0242* (2013.01); *G01J 1/08* (2013.01); *G01J 3/2823* (2013.01);
(Continued)

(58) Field of Classification Search
CPC .......... G01J 1/0242; G01J 1/08; G01J 3/0291; G01J 3/14; G01J 3/18; G01J 3/2823; G01J 3/504; G01N 2021/559; G01N 2021/575; G01N 21/255; G01N 21/55; G01N 2201/06113; G01N 2201/062
See application file for complete search history.

(56) References Cited

U.S. PATENT DOCUMENTS

| 2006/0023222 A1* | 2/2006 | Binder .................... G01J 1/04 |
| | | 356/446 |
| 2016/0161330 A1 | 6/2016 | Baboulaz |

FOREIGN PATENT DOCUMENTS

| DE | 102008046988 A1 | 4/2010 |
| FR | 2818377 A1 | 6/2002 |
| FR | 2858412 A1 | 2/2005 |

* cited by examiner

*Primary Examiner* — Hina F Ayub
(74) *Attorney, Agent, or Firm* — Craft Chu PLLC; Andrew W. Chu (57) ABSTRACT

The optical device for measuring at least one of reflected light (BRDF) and transmitted light (BTDF) from a sample, in all spherical directions of space around the sample, for each spherical direction of incident light includes a light source, and a goniophotometer configured to measure at least one of: directions of the incident light in spherical coordinates, and directions of the reflected light in spherical coordinates. The device further includes a dispersive screen, and a multi-sensor imaging device. The goniophotometer includes a first articulated arm supporting the light source; and a second articulated arm supporting the sample or a sample holder.

11 Claims, 3 Drawing Sheets

(51) Int. Cl.
 *G01J 1/08* (2006.01)
 *G01J 3/28* (2006.01)
(52) U.S. Cl.
 CPC . *G01N 2021/559* (2013.01); *G01N 2201/062* (2013.01); *G01N 2201/06113* (2013.01)

OPTICAL DEVICE FOR MEASURING THE OPTICAL PROPERTIES OF MATERIALS

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to the field of optics for measuring the optical properties of materials, specifically the light/matter interaction, in particular for rendering problems for the generation of synthetic images where it is necessary to characterize the reflection or transmission of a surface.

2. Description of Related Art Including Information Disclosed Under 37 CFR 1.97 and 37 CFR 1.98

Rendering, also known as texturing, is a computer process that calculates the 2D image of a scene created in 3D modeling software with both objects and light sources and viewed from a specific point of view.

It is then a question of making predictive synthetic images, which are possible thanks to measurements of optical characteristics of materials according to the device proposed here, which is useful in particular in the fields such as automobile, architecture, jewelry, furniture, decoration, photovoltaic panels, solar glasses for glasses, thermal building, etc.

In this context, the spectrum of incident light is essentially visible, where by "visible" is meant a spectral window between 250 nm (UV) and 2500 nm (near infrared); therefore for brevity the term "visible" will be omitted in the rest of the description.

When an object is subjected to a light source, it can reflect light, transmit light or absorb light. The interaction of light with an object is a complex phenomenon that is determined by the optical properties of the material or materials that make up the object.

To characterize these optical properties, there are solutions using cameras, but they work in 3 colors: red, green and blue (or RGB by anglicism), and in fact do not allow spectral analysis outside these 3 ranges of wavelengths.

However, the optical characteristics of a material are described by the formalisms of bidirectional reflectivity, better known by its acronym BRDF for Bidirectional Reflectance Distribution Function, and bidirectional transmittance, or BTDF for Bidirectional Transmittance Distribution Function in English.

For measuring BRDF, it is known from US2016161330 that a light source is mounted on an arcuate arm, the arm being rotatable and translatable, so that the light source can cover any point on the periphery of a hemisphere centered on a point on the plane of the paint.

However, this document does not disclose a spectral measurement in the sense of the present invention. Moreover, the relative position of the light source and the camera is constrained by the shape of the arc-shaped arm.

Also known are documents DE102008046988, FR2818377 and FR2858412, none of which propose the 6 degrees of freedom of the articulated arms according to the present invention.

An optical measuring device is proposed herein for optically characterizing a sample of material, hereinafter referred to as "sample" or "material" for brevity, by measuring at least one of the BRDF and BTDF of said sample.

The BRDF and BTDF are mathematical functions that depend on the following 8 parameters:
- the illumination angle of the material, characterized by the two values $\theta\_in$ (zenith angle) and $\varphi\_in$ (azimuth angle), the directions of the incident light in spherical coordinates,
- the material viewing angle, characterized by the two values $\theta\_out$ (zenital angle) and $\varphi\_out$ (azimuth angle), the directions of the reflected light in spherical coordinates,
- the incident wavelength $\lambda$,
- the (x,y) position of a point in a material-bound reference frame, and
- the p-polarization of the light, which can be formalized with a Mueller matrix.

BRDF and BTDF predict the appearance of an object depending on the angle at which it is observed and also depending on the angle at which it is illuminated.

The BRDF is a probabilistic distribution function that is not normalized (does not conserve energy), to take into account the absorption of light by the material.

Due to the fine sampling of at least the 5 parameters $\varphi\_in$, $\varphi\_out$, $\theta\_in$, $\theta\_out$, and $\lambda$ among the 8 listed above, the measurement of the optical properties of light sources or materials is a generally time-consuming process.

This sampling is classically performed using a spectro-goniophotometer that performs a point-by-point measurement of the light reflected from the sample in all directions in space. The measurement times are of the order of several days. Their use is therefore difficult in an industrial context.

On the contrary, the optical measuring device proposed here exploits a plurality of sensors distributed spatially in a predetermined manner, allowing the simultaneous measurement of the light reflected or transmitted by the sample towards a plurality of points located around it, each point corresponding to a respective sensor.

In this case, the sensors are those of a hyperspectral camera which allows the measurement of the radiance, luminance and spectrum of the reflected light.

A hyperspectral camera is similar to a conventional camera equipped with a spectrograph, with the difference that it acquires a single column of the image at a time. A spectrograph is a tool composed of lenses and a dispersive element that separates the light into its different components. Each component is then associated with its wavelength.

The invention is thus based on a plurality of sensors allowing the simultaneous measurement of the light emitted around the material to be characterized, moreover over a large spectral window. This device makes it possible to reduce measurement times.

BRIEF SUMMARY OF THE INVENTION

More specifically, the invention relates to an optical device for measuring optical properties of materials comprising at least one of: light reflected (BRDF) and light transmitted (BTDF) by the material of a sample (20) in all spherical directions of space around said sample (20), for each spherical direction of incident light, the device comprising:
a light source (30), and
a goniophotometer configured to measure at least one of:
the directions of the incident light in spherical coordinates (θ_in,
the directions of reflected light in spherical coordinates (θ_out, φ_out).
It is essentially characterized in that it further comprises:
a multi-sensor imaging device, configured to determine the emission spectrum of incident light from a set of points in the scene observed by the multi-sensor imaging device over a set of layers; the goniophotometer being in the form of a cell (100) comprising:
a first articulated arm (110) in three dimensions of space and configured to support the light source (30); and
a second articulated arm (120) in three dimensions of space and configured to support the sample (20) or a sample holder (10);
the relative orientations of the first articulated arm (110) and the second articulated arm (120) being controllable;
the device optionally further comprising said sample (20).

In one embodiment, the optical device further comprises a dispersive screen (40), the position and spatial orientation of which is preferably adjustable.

In an embodiment, the optical device further comprises a memory comprising at least one of:
a first correspondence table comprising a correspondence between a coordinate point (X, Y) of a specularly reflecting element disposed in place of the sample (20) during a geometric calibration step, and its reflection on the dispersive screen (40), for a plurality of incidences; and
a second look-up table, comprising multiplicative coefficients calculated after a photometric calibration; and
a third look-up table comprising a correspondence between a pixel of coordinates (U, V) the hyperspectral camera (50), and the corresponding values (θ_in, θ_out, φ_out; x and y) the cell (100) optionally being further equipped with at least one of:
a scanning laser, configured to, upon detection of presence, inhibit at least one of the light source (30), the first articulated arm (110) and the second articulated arm (120); and
a polarizing filter, integral with the light source (30) or the multi-sensor imaging device, and optionally having a variable polarization axis.

In one embodiment, the optical device is configured so that the scene observed by the multisensor imaging device is:
either said dispersive screen (40)
or the sample (20).

It may be provided that the light source (30) is configured to emit an incident light beam (70) having a circular section of equivalent diameter between 0.1 mm and 20 mm, optionally modifiable, and which is capable of generating up to 1,000,000 lux.

It can be foreseen that the light source (30) comprises:
Either a set of at least 3 adjacent LEDs, one of which emits white light, one of which emits deep red light and one of which emits violet light, so as to emit the entire visible spectrum;
Or several LEDs whose respective beams are mixed thanks to semi-reflective blades, the light source (30) being optionally configured as a system on chip (SOC).

It can be provided that the dispersive screen comprises a fluoropolymer coating that has a high Lambertian reflection.

It may be provided that the orientation of the dispersive screen is variable. For example, the screen is positioned on a rotatable support. Preferably the position of the dispersive screen is fixed once and for all prior to a series of measurements for which the orientation is the same for all light incidences.

It can be envisaged that the multi-sensor imaging device is a hyperspectral camera (50). Preferably said hyperspectral camera (50) includes a wavelength splitting device that allows spectral decomposition of incident or reflected light.

The hyperspectral camera (50) may be provided configured to view the dispersive screen (40) or sample (20) column by column and determine the spectrum, luminance, and radiance at each pixel of the hyperspectral image.

It may be contemplated that the device according to the invention further comprises a computer configured to calculate for a set of points (x,y) in a frame of reference related to the sample at least one of:
a map of normals to the sample (20) from values (θ_in, φ_in) of incident light and values (θ_out, φ_out) of reflected light, and
a textured global BRDF, which is the collection of point BRDFs, with each pixel in a texture of the sample (20) being characterized by one of these point BRDFs.

The present invention has a fairly high angular resolution, i.e. greater than a threshold value, which allows one to determine how light is reflected around the peak specularity of a sample.

The present invention provides access to data which, when used with suitable processing software (for example, the software sold under the registered trademark "Ocean" by the company Eclat Digital Recherche), makes it possible to obtain a photorealistic rendering, i.e., a visual rendering so detailed that it can pass for a photograph, with measurement times that are shorter than the measurement times known to date.

The invention also allows applications of the "quality control" type, of the conformity control type of materials, such as for example paints, in particular glittery automotive paints, brushed aluminum, metal, of the defect analysis type, of the fine colorimetric characterization type, etc.

Other features and advantages of the present invention will become clearer upon reading the following description given as an illustrative and non-limiting example and made with reference to the appended figures.

DETAILED DESCRIPTION OF THE INVENTION

The measurement device proposed herein measures at least one of BRDF (reflected light) and BTDF (transmitted light) by the material of a sample 20 in all spherical directions of space around said sample 20, for each spherical direction of incident light.

The proposed optical measurement device includes:
- a light source 30,
- a dispersive screen 40,
- a multi-sensor imaging device,
- a goniometer (not shown).

If applicable, the proposed optical measurement device also includes a sample 20.

3D simulation software exists which, for an arbitrary geometry of a scene, simulates the propagation of light from light sources by calculating virtual light rays which intersect with said geometry, and are then reflected or transmitted.

The present invention allows said rays to be reflected according to the BRDF or BTDF measured through the device according to the invention, i.e., according to the material measurements that have been made beforehand. At each point of the 3D geometry, the same optical properties are applied if the material is not textured, or not if the material is textured (i.e. a material for which the BRDF or BTDF is different for different points x,y). Similarly, if the material has micro-reliefs, the average BRDF is modified locally according to the local normal which is calculated as described later.

Spectro-Goniophotometer

By goniophotometer, we mean any device, apparatus or sensor, which allows the measurement of light beam angles.

Figure 1:
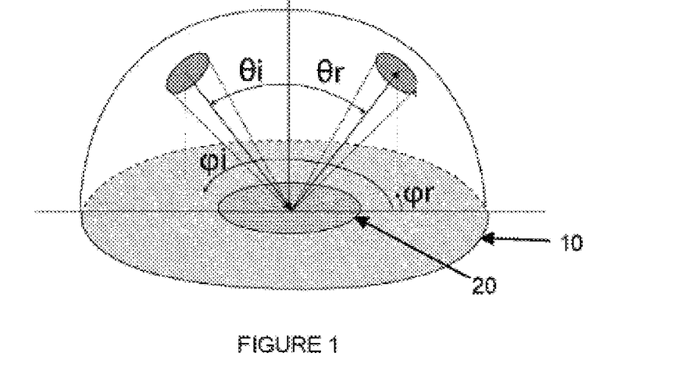
FIG. 1 is a schematic view illustrating incident light and reflected light in spherical coordinates on a sample whose normal is the Z axis.
Figure 2:
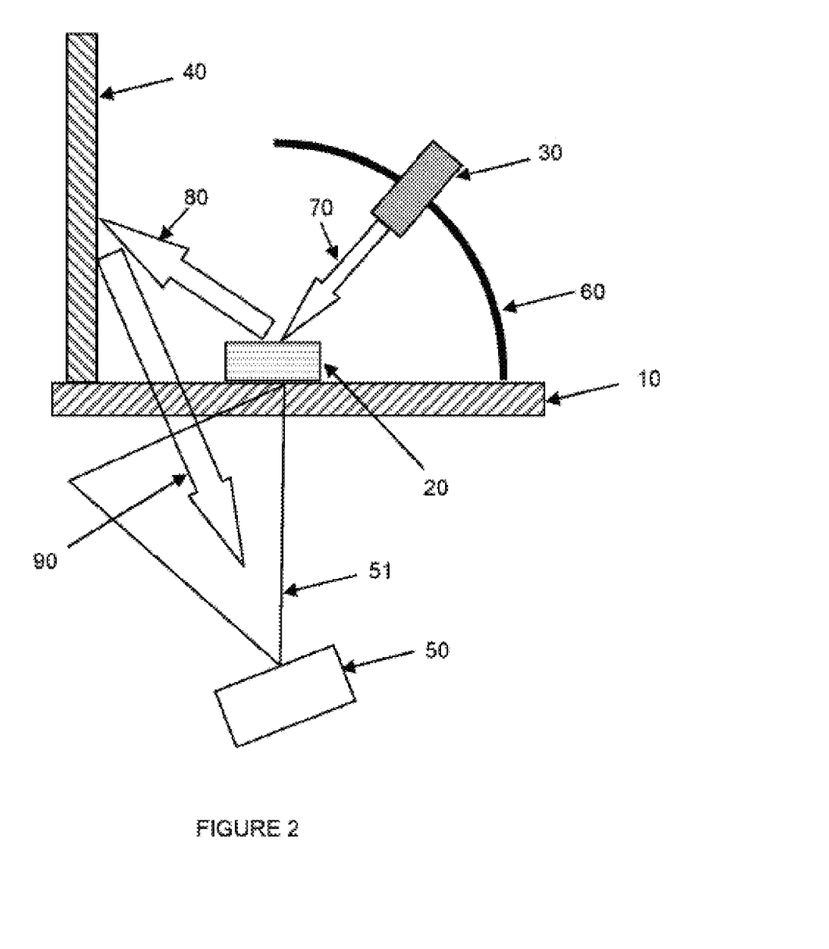
FIG. 2 is a schematic view illustrating one embodiment of the device according to the invention.
Figure 3:
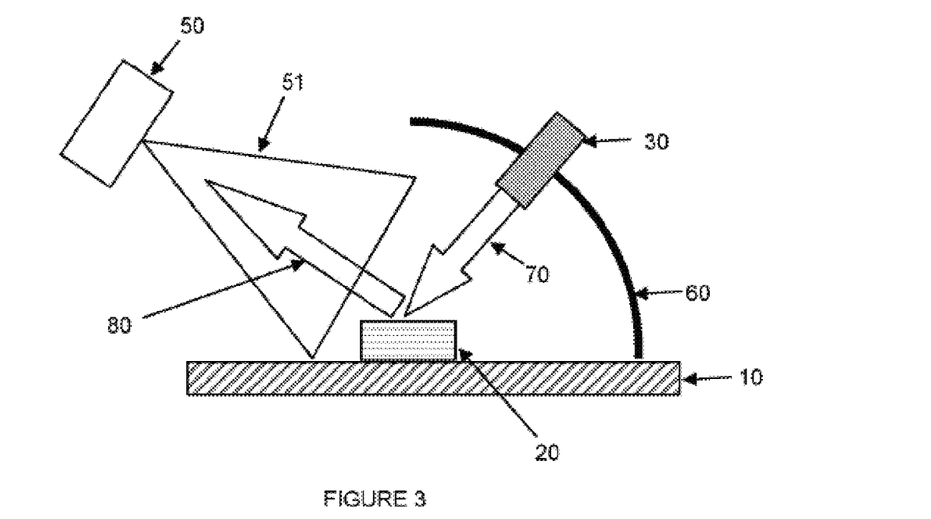
FIG. 3 is a schematic view illustrating another embodiment of the device according to the invention.

In a first embodiment, shown in FIG. 2 and FIG. 3, any known goniophotometer configured to determine (measure) at least one of:
- $\theta\_in$, $\varphi\_in$, the directions of the incident light in spherical coordinates,
- $\theta\_out$, $\varphi\_out$, the directions of the reflected light in spherical coordinates.

With:
- $\theta$ the zenith between 0° (normal direction) and 90° (tangent direction to the plane object),
- $\varphi$ the azimuth,
- the index_in corresponding to the incident light beam 70 illuminating the sample 20 (or dispersive screen 40 if applicable), and
- the index_out corresponding to the incident light beam 70 reflected or transmitted by the sample 20.

Various models of goniophotometers exist on the market; they allow the measurement of 4 of the 5 parameters, i.e. $\varphi\_in$, $\varphi\_out$, $\theta\_in$ and $\theta\_out$. The value $\varphi\_in$ is sometimes fixed with a single value, for example 0°.

Advantageously, a spectrometer is planned to be coupled to the goniophotometer, which then allows the 5th parameter $\lambda$ to be measured. For example, the reflected light is captured and then transmitted through an optical fiber to a spectrophotometer.

The spectro-goniophotometer includes at least one sample holder 10 on which the sample 20 is arranged. The said sample 20 is illuminated by a light source 30 described below, at an angle between 0° and 180° with respect to its normal.

For example, the light source 30 is movable along an arch 60.

Figure 4:
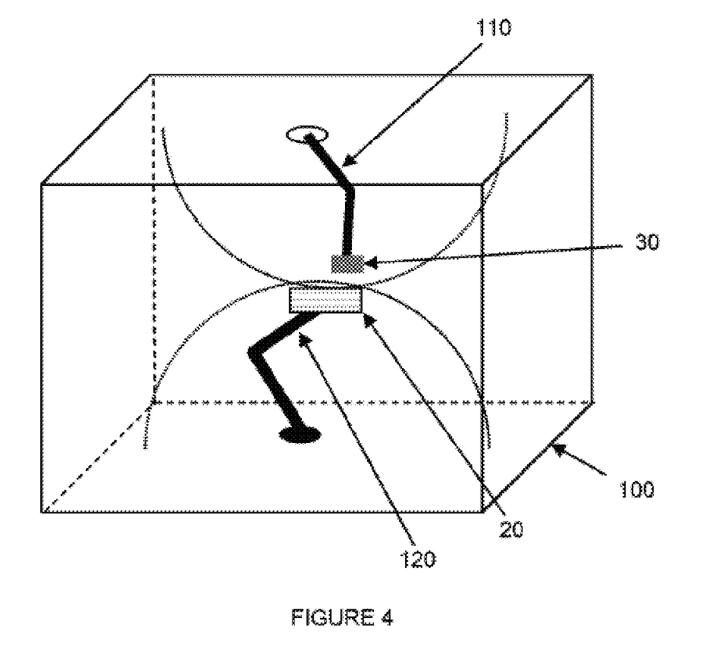
FIG. 4 is a schematic view illustrating one embodiment of a cell according to the invention.
Figure 5:
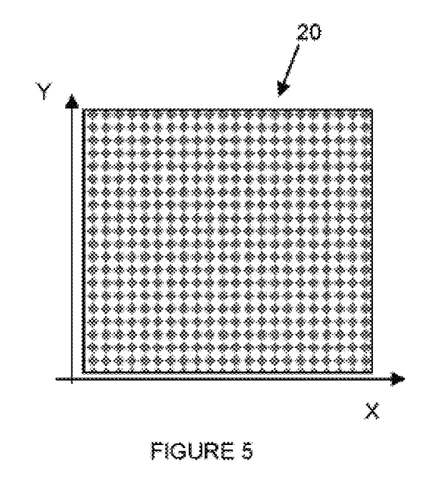
FIG. 5 is a schematic view illustrating a set of x,y coordinate points, on a sample.
Figure 6:
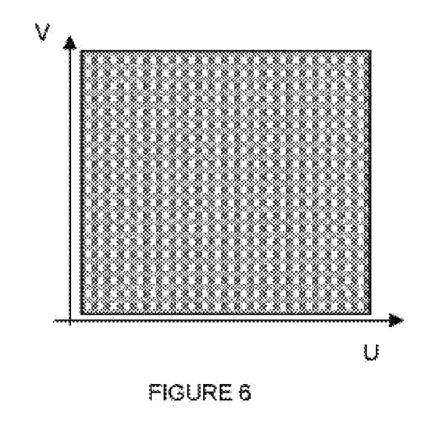
FIG. 6 is a schematic view illustrating a set of pixels with coordinates u,v in the hyperspectral image of the sample in FIG. 5.

In a second embodiment, illustrated in FIG. 4, it is envisaged that the device according to the invention comprises a goniophotometer in the form of a cell 100 equipped with two robotic arms for precisely positioning and orienting, on the one hand, the sample 20 and, on the other hand, the light source 30 with respect to the sample 20, that is:
- a first articulated arm 110 with 6 degrees of freedom, and configured to support the light source 30; and
- a second articulated arm 120 with 6 degrees of freedom, and configured to support the sample 20 or a sample holder 10, such that each arm is articulated on a respective half-sphere, shown as dotted lines in FIG. 4, all points of a half-sphere being operable, with a repositioning repeatability to within 0.018 mm.

Each arm has two ends, one of which is equipped with a gripping device. For example, the gripping device is a clamp, in this case actuated by compressed air. In one embodiment, each arm can carry up to 7 kg.

In this case, the arm intended to support the sample 20 comprises a clamp equipped with parallel jaws that grip the sample 20 or a sample holder 10.

It can be foreseen that the clamp can also, at the time of photometric calibration, grip the dispersive screen 40.

In this case, it is envisaged that the two arms are arranged inside a parallelepiped cell 100 comprising a plane floor and a plane ceiling, the cell 100 being such that the fixed end of one arm is integral with the ceiling and the fixed end of the other arm is integral with the floor.

A graphical interface can be provided which allows the position of a point on the sample 20 to be defined in relation to the center of the cell 100 and the orientation along 3 axes, as well as the position and orientation of the light source 30 in spherical coordinates in a reference frame whose origin is the point defined on the sample, one axis being the normal to the sample, the other two axes being perpendicular and in the plane of the sample.

Preferably the arms are black in color to avoid light reflection that could otherwise disturb the measurements.

Provision may be made to equip the cell 100 with a scanning laser (not shown), configured to inhibit the light source 30, particularly in case of presence detection. Indeed, the light source 30 can be very powerful and potentially dangerous. The scanning laser can be useful to stop the movement of the robots if an operator approaches the cell 100, to avoid being injured by the robots in case of rapid movement.

Light Source 30

A light source 30 is provided, possibly collimated, preferably without optical fiber, to emit an incident light beam 70. Indeed, an optical fiber absorbs energy (around 400 nm and up to 450 nm) and has different absorption characteristics depending on the shape of the fiber. However, the shape of the fiber would be different depending on the position and orientation of the robots, which would disturb the measurements.

In one embodiment, the light source 30 is configured to emit an incident light beam 70 having a circular section with a diameter of between 0.1 mm and 20 mm, and which is capable of generating up to 1,000,000 lux.

Preferably, the light source 30 is intended to emit according to a continuous spectrum, i.e. one that has energy throughout a predetermined spectral window, in this case the visible window.

Several tests have been conducted, for example with Xe-Me lamps or arc or LED lamps.

Preferably, the light source 30 emits a white light and comprises a set of at least 3 adjacent LEDs, one of which is white, one is deep red and one is violet, which allows to emit on the whole visible spectrum. One can also provide several LEDs whose respective beams are mixed thanks to semi reflective blades. For example, the beams coming from two LEDs (for example white and violet) will be mixed thanks to a semi-reflecting blade, which makes it possible to place the two LEDs at different places (for example on perpendicular surfaces one with respect to the other), but to obtain a beam as if the two LEDs were placed at the same place. This can be done in series with several LEDs and several blades parallel to each other: the beam mixed once passes through a second semi-reflective blade, which allows to add the light from a third LED, red for example. At the exit of this second blade, the three LEDs are virtually placed at the same place. This allows energy to be delivered over the entire visible spectrum in a narrow beam that can then be diverged to obtain a "sharp" cone of light, i.e., all the light from a small, almost point-like area, so that each point of the illuminated sample receives light from only one direction.

For example, the light source 30 is a system-on-chip (SOC).

In one embodiment, the light source 30 is a system-on-chip that has dimensions substantially equal to 55 mm×55 mm. Thus, the light source 30 does not interfere with the 6 degrees of freedom of the articulated arms.

In one embodiment, the light source 30 comprises a set of N adjacent LEDs, with N a natural number. For example, N is between 20 and 60 and preferably N is between 30 and 40. In the case in point, these are either white LEDs with preferably different spectra, or LEDs with a spectrum centered on a wavelength and of substantially Gaussian shape with a width at half-height of between 20 nm and 40 nm, each LED emitting on a known wavelength spectrum, each LED being selectively activatable. Thus, we have a hyperspectral light source 30.

Preferably, it is provided that at least one LED is white and the others have a spectrum centered on a respective wavelength and of substantially Gaussian shape with a half-value width between 20 nm and 40 nm. Preferably, a set of wavelengths distributed at least over the visible spectrum (380 nm to 780 nm) is provided.

For example, a set of LEDs centered respectively on the following wavelengths may be provided: 380 nm, 390 nm, 405 nm, 415 nm, 425 nm, 440 nm, 450 nm, 470 nm, 480 nm, 490 nm, 505 nm, 520 nm, 550 nm, 590 nm, 620 nm, 630 nm, 660 nm, 670 nm, 730 nm.

Alternatively or additionally, a set of LEDs centered on the infrared (780 nm to 2500 nm), and in particular 850 nm to 1550 nm, can also be provided. The LEDs centered on the infrared allow in particular the measurement of the optical characteristics of the materials with a view to their simulation when they are illuminated by a LIDAR (scanning laser), which allows applications of design, evaluation and validation of the systems of assistance to the car driving and autonomous driving of motor vehicles.

Alternatively or in addition, a set of LEDs focused on the ultraviolet (250 nm to 380 nm) can also be provided.

Such a light source allows access to the characterization of fluorescent materials, which emit wavelengths different from those received, and phosphorescent materials, which emit light after having received it, for a certain duration, and potentially also of wavelengths different from that received.

The advantage of such an LED light source is that its energy efficiency is much higher than that of a conventional monochromator, so that the flux produced for a given electrical power is much higher. However, in order to be able to measure the spectral BSDF with a good level of accuracy and in a reduced time, a lot of incident flux is required, which is necessary for hyperspectral sensors. The need for high flux is even more crucial when characterizing BSDFs in a surface manner, especially textured BSDFs, because the flux is distributed over the surface of the material and not concentrated in one point.

Such a light source consisting of several LEDs works in symbiosis in the system with articulated arms with 6 degrees of freedom, since they allow each LED to be precisely positioned in spherical coordinates in a reference frame whose origin is defined on the sample, and each LED can be precisely positioned in turn. Such a positioning is necessary for the measurement of BSDFs, in particular fluorescent and phosphorescent BSDFs, and in particular when one seeks to characterize these functions in a set of points on the sample.

Thus, a set of BRDFs and/or the BTDF of a sample 20 may be calculated for a predetermined position of the light source 30 and a predetermined position of the sample 20, with each value of the calculated BRDF and/or BTDF corresponding to the selective activation of one or more LEDs of the light source 30. For example, LEDs with no spectral overlap (e.g. UV and IR; or UV and visible but with no spectral overlap) can be turned on, allowing the BRDF/BTDF for the wavelengths of the different sources used to be measured for a single source position, with the different position of the LEDs being taken into account when constructing the BRDF, by angular interpolation methods. Indeed, the angles of incidence of the light coming from the different LEDs are slightly different, so an interpolation allows to estimate the BRDF for arbitrary angles for all the wavelengths of the sources used.

With this configuration, it is possible to characterize samples of fluorescent or phosphorescent materials.

The size (equivalent diameter) of the incident light beam 70 may be expected to be changeable. The size of the incident light beam 70 chosen depends on the type of material of the sample 20 to be optically characterized. Typically, for specular materials, a small size of the incident light beam 70 is preferred, in order to have optimal accuracy at the specularity peak. For more diffuse materials, i.e., materials that tend to scatter light uniformly in all directions in space, a larger beam size may be used.

For example, a wider incident light beam size 70 is ideal for characterizing textured materials, whose BRDF can vary greatly from point to point on the sample 20. Thus, since BRDF is characterized by emitted light versus received light, taking a wider beam size averages the measurement to gain representativeness, which is valid only in the case (first embodiment described later) where the camera 50 scans the dispersive screen 40 and not the sample. In the second embodiment described later, in which the hyperspectral camera 50 scans the sample 20, it is preferable that the light beam be wide. In this second embodiment, the measurement is performed pixel by pixel of the hyperspectral camera 50: there is no averaging at the measurement level. However, it is possible to perform averaging, by software calculation, by digitally averaging several measurements of several adjacent pixels.

A linearly polarized filter, whose orientation can be varied, can be placed in front of the hyperspectral camera 50. From 3 polarization directions, in this case 0°, 45° and 90°, the polarization of the light can then be characterized, thanks to the Mueller matrices, which makes it possible to measure the polarized BRDF or BTDF of, for example, windows, windshields, etc., which polarize the light, which is of interest in particular in the simulation of motor vehicles and building glazing in architecture.

The light source 30 can be equipped with a polarizing filter. The rotation of the assembly (light source 30+polarizing filter) around the optical axis of the light source 30, thanks to the robotic arm, allows the modification of the direction of polarization of the light incident on the sample, without calling upon an additional automation system to rotate the filter with respect to the source and thus obtain the same effect.

Similarly, the multi-sensor imaging device can be equipped with a polarizing filter. It can then be foreseen that the multi-sensor camera is mounted on a robotic arm and that the sample is then placed on a fixed support. The rotation of the multisensor imaging device around its optical axis allows the modification of the polarization direction of the analyzed light, without having to use an additional automation device for the rotation of the filter with respect to the multisensor imaging device.

Thus, the orientation of the polarization direction can be changed by the robotic arms themselves, by rotating the light source 30+polarized filter and/or multi-sensor imaging device+polarized filter.

Dispersive Screen

A dispersive screen 40 is provided, preferably with a high Lambertian reflection, i.e. above a predetermined threshold value. For example, a screen comprising a fluoropolymer coating is provided.

The dispersive screen 40 is optionally flexible.

In the present case, a dispersive screen 40 made of Spectralon (registered trademark) is provided; it diffuses uniformly in all directions of space about 99% of the received light, which makes it possible to dispense with a perfect orientation of the dispersive screen 40 with respect to the sample 20. For the sake of brevity, only Spectralon will be described here as dispersive screen 40. Also, the "trademark" character thereof will be omitted in the remainder of this description.

The dispersive screen 40 materializes a set of spherical directions to which the sample 20 reflects incident light for the first embodiment (described later). For the second embodiment (described later), the dispersive screen 40 directly reflects light from the light source during the photometric calibration phase.

For example, the dispersive screen 40 has a flat, preferably rectangular, or convex shape, for example partially cylindrical or at least semi-hemispherical.

For example the dispersive screen 40 has dimensions of 200*200 mm$^2$.

Sample

A sample 20 is provided, the coating of which is a material whose synthesis images are to be generated or characterized, for example for quality control purposes.

As non-limiting examples, one may provide:
a sample 20 of painted sheet metal to generate the rendering of a motor vehicle whose bodywork is or will be made with said sheet metal;
a sample 20 of particular glass (for example polarizing) to generate the rendering of a building equipped with windows made from said particular glass;
etc.

The sample 20 is preferably planar. It may include micro-relief and/or have a texture. The BRDF of a sample may be constant over the entire sample but with variations in normals locally in the case of micro-reliefs. With a texture, the BRDF of a sample is characterized by the set of BRDFs, which are different at different points of the sample.

Preferably, the sample 20 has a surface area greater than 2 mm$^2$.

Multisensor Imaging Device

Preferably, it is contemplated that the multi-sensor imaging device is a hyperspectral camera 50.

A hyperspectral camera 50 generates an image comprising a set of superimposed layers, each layer of which corresponds respectively to a sensor configured to be sensitive only to a single quasi-monochromatic wavelength.

In the present case, a hyperspectral camera 50 with 946 layers is provided, which allows to analyze a spectral window from 400 to 1000 nanometers with a resolution of about 0.64 nm and to know the spectrum emitted by a set of physical points observed in the scene on 946 layers instead of 3 layers for an RGB camera.

Compared to an RGB camera, the signal-to-noise ratio of a hyperspectral camera 50 is divided by the number of layers, so it is advantageous to meet at least one of the following criteria:
a lot of incident energy, i.e. above a predetermined threshold value, hence in this case a light source 30 capable of emitting up to 1,000,000 lux so that the light reflected from the dispersive screen 40 or the sample material 20 contains sufficient energy;
long pause time, i.e., greater than a predetermined threshold value.

By acquiring a hyperspectral image of the screen, information about the light emitted toward the spherical directions materialized by the dispersive screen 40 is obtained.

A hyperspectral camera 50 includes a lens that allows the analysis of a single column of the observed scene, i.e. a stack of pixels, in this case 2184 pixels, unlike CCD sensors for example which analyze columns and rows. The field of view 51 of the hyperspectral camera 50 is fan-shaped.

Behind the lens, the hyperspectral camera 50 includes a wavelength separation device, for example prisms, diffraction gratings, etc., which allows spectral decomposition.

At the output of the wavelength splitting device is a 2D sensor (typically CCD or CMOS/SCMOS).

The wavelength separation device allows, for a pixel of the column, to separate the incident light captured by said pixel according to all its wavelengths (in this case 946 layers) and, at its output, to print a line of the 2D sensor. The width of the 2D sensor must therefore be greater than or equal to the number of layers of the hyperspectral camera 50.

Thus, we have a spatial dimension on a column of the hyperspectral camera 50, combined with a spectral dimension per line of the 2D sensor.

The hyperspectral camera 50 is mounted on a mechanical device for observing the scene, in this case the dispersive screen 40 or the sample 20, for example a stepper motor, in order to scan the latter by successive rotations about a vertical axis.

In operation, the hyperspectral camera 50 scans the dispersive screen 40 or the sample 20 column by column and gives the spectrum (from which the luminance and radiance can be deduced) in each pixel of the hyperspectral image. Each pixel in the hyperspectral image corresponds to a spherical direction in space toward which the sample material 20 reflects light. It then remains to match the spherical directions of observation ($\theta\_out$, $\varphi\_out$) to the pixels of the hyperspectral image.

In the embodiment with a cell 100 comprising a scanning laser, the hyperspectral camera 50 is positioned beyond the field of view of said scanning laser.

Calibration

Preferably, provision is made for prior calibration of the device according to the invention.

Preferably, at least one of:
- a geometric calibration, which aims at obtaining a correspondence between a pixel and the values of $\theta\_in$, $\theta\_out$, $\varphi\_out$ for a given incidence, as well as x and y in the second embodiment described later; and
- a photometric calibration, which aims to obtain relative measurements between a sample and a reference material;

the calibrations being described later.

Operation

At least one of the BRDF and BTDF of a sample 20 is measured using the measurement device, which consists of measuring, for each possible spherical direction of incident light, the light reflected 80 or transmitted by the sample 20 in all spherical directions of space around said sample 20.

In order to obtain the BRDF of a sample 20, it is necessary to measure the light reflected 80 from it for different angles of incidence.

Thus, there is a measurement process that consists of recording the measurements of the hyperspectral camera 50 for a predetermined relative position of the light source 30 with respect to the sample 20.

Advantageously, therefore, a system for relative positioning of the sample 20 and the light source 30 is provided.

The measurement process is iterative: the relative position of the light source 30 with respect to the sample 20 is changed to a new predetermined relative position and the measurements of the hyperspectral camera 50 are recorded, etc.

For this purpose, it can be foreseen that the light source 30 is mounted on a mechanical system connected to a computer capable of controlling the modification of its angle of incidence with respect to the normal to the sample 20. The values of orientations taken by the light source 30 with respect to the normal to the sample 20 may be between 0° and 180°. Preferably at each measurement, only the tilt of the light source 30 varies.

When the orientation values taken by the light source 30 are between 0° and 90°, the portion of light reflected from the sample 20 to the dispersive screen 40 covering in this case a half-hemisphere portion above the material is measured; and when the orientation values taken by the light source 30 are between 90° and 180°, the portion of light transmitted by the sample 20 to the dispersive screen 40 covering a half-hemisphere portion above the material is measured.

A translucent sample 20 may be illuminated from the half hemisphere opposite the half hemisphere in which the dispersive screen 40 is positioned, thereby allowing measurement of the BTDF Any of the two embodiments described below may be provided in which 2 of the 3 elements (sample 20; light source 30 and hyperspectral camera 50) are movable and the 3rd is translationally immobile.

Preferably, the hyperspectral camera 50 is immobile in translation on a tripod and mounted for its rotation around a vertical axis thanks to a stepper motor, like a hyperspectral camera 50 mounted on an Earth observation satellite: the satellite is immobile and the Earth rotates in the field of observation in the reference frame linked to the satellite. In this case, the sample 20 and the light source 30 are mobile, for example on the articulated arms of the cell 100 described above, which advantageously allows for easy sensor changes, including for example exchanging the hyperspectral camera 50 for an RGB camera.

For analysis with a polarized filter, it may be advantageous to mount the hyperspectral camera 50 on the robotic arm.

First Embodiment

In a first embodiment, only the dispersive screen 40 is filmed with the hyperspectral camera 50, i.e. the sample 20 is not filmed.

A so-called absolute geometric calibration or a so-called relative geometric calibration can be implemented.

The dispersive screen 40 is filmed by the hyperspectral camera 50 for the analysis of the sample 20 and for the photometric calibration described below.

In a first variant of geometric calibration, called absolute, it is planned to scan with the hyperspectral camera 50 a specular reflection element, in this case a mirror, arranged in place of the sample 20, preferably with a light source of very small equivalent diameter.

A correspondence can then be established, in the form of a table of correspondence recorded in a memory, between a point of coordinates x, y of the specular reflection element, and its reflection on the dispersive screen 40, for a plurality of incidences; it is then necessary, for the measurements of the sample 20 that one seeks to characterize optically that the said sample 20 has exactly the same orientation as the mirror for a given angle of incidence and that the dispersive screen 40 is in the same position.

This can be achieved by using a robotic arm to first position and orient the mirror and then the sample in the same manner.

More precisely, the reference dispersive screen 40 is replaced by a reference mirror whose spectral Fresnel coefficients are known for different incidences of the light incident on the reference mirror.

The BRDF of the reference mirror and of the sample 50 to be characterized can then be measured and the spectral Fresnel coefficients of the sample 50 can be deduced by simple ratio.

In a second variant of geometric calibration, called relative calibration, no specular reflection element is used and the sample 20 is illuminated directly by the light source. In this variant, for a given angle of incidence, the pixel of the hyperspectral image with the highest intensity is determined. It is assumed that most materials have a specularity peak whose maximum is positioned exactly at the Descartes direction. We can therefore select the pixel whose intensity (which is the integral of the spectrum) is maximum and consider that this pixel corresponds to the Descartes direction. This process can then be repeated for a plurality of incidence angles and interpolated between the determined values and thus establish a correspondence, in the form of a correspondence table stored in a memory, between a point of coordinates X, Y of the sample 20, and its reflection on the dispersive screen 40, for a plurality of incidences.

As an alternative or in combination, a photometric calibration can be implemented, in which a series of hyperspectral images is made for which a reference material, of which at least the BRDF is known, is placed in place of the sample 20 to be characterized. Advantageously, a piece of Spectralon is used as the reference material. Preferably, the dimensions of the reference material are greater than or equal to those of the area of the sample 20 to be characterized illuminated by the light source.

For each hyperspectral image, the value of the measurement from the hyperspectral camera 50, for each pixel, can then be compared to a reference value and thus determine the transformation to be used to obtain data that is that of a BRDF output from the hyperspectral camera 50.

Indeed, what is observed on the dispersive screen 40 is the light reflected by the reference material (piece of Spectralon), whose reference value is its BRDF, which is known, and is equal to rho/pi for any direction of reflection and for any wavelength, with rho the reflection factor=about 0.99 (calibrated by the manufacturer of the Spectralon). With a reference material whose BRDF is constant for a given wavelength, one thus obtains a correspondence table, recorded in a memory, in this case a table of mutliplicative coefficients, by incidence and by wavelength, to be applied then to the sample 20 to be characterized.

The spectrum measurements on the dispersive screen 40 of the sample 20 can then be transformed into absolute BRDF values since it is known what transformation to apply to them; that is, the same as that which must be applied to pass from the spectra measured when using the reference material (piece of Spectralon) instead of the sample 20 to the BRDF value of the Spectralon which is known. Note that this calibration corrects for defects in the incident light source 30 and the geometric configuration between the hyperspectral camera 50, the dispersive screen 40, and the sample 20.

In this first embodiment, illustrated in FIG. 2, the dispersive screen 40 covers, for example, a portion of a hemisphere, in this case a portion of a half hemisphere, above the sample 20 of the material used, so that a maximum of the reflected light 80 from the sample 20 is reflected back to the dispersive screen 40.

In this embodiment, the sample 20 is preferably positioned horizontally.

The dispersive screen 40 is positioned on a support, preferably rotatable, whose orientation is fixed once and for all before a series of measurements, so that it has the same orientation for all light incidence.

The dispersive screen 40 reflects light back to the hyperspectral camera 50. Thus, measurement of light from the sample 20 to a plurality of directions is made possible.

Thus, a portion of the light incident from the light source 30 is reflected 80 or transmitted (depending on the type of measurement) from the sample 20 to the dispersive screen 40, and the hyperspectral camera 50 is configured to scan the dispersive screen 40.

The sample 20 is thus positioned between the dispersive screen 40 and the light source 30.

For each of the orientations of the light source 30 with respect to the normal to the sample 20, the hyperspectral camera 50 scans the dispersive screen 40 on which a portion of the light transmitted or reflected by the sample 20 is reflected as a reflected beam 90.

In the end, as many hyperspectral images are obtained as there are incidences of the light source 30.

The sample 20 reflects light preferentially around the specularity peak. In the diffuse part, there may be very little energy reflected from the sample 20, so it may be necessary to perform measurements with different acquisition times. An acquisition time of 5000 ms provides an accurate measurement in the diffuse portion. A measurement with an acquisition time of 15 ms allows to have an accurate measurement in the specular spot, without saturation. Alternatively, a single short acquisition time, for example about 15 ms, can be provided by modifying the flux of the light source 30 and thus its illumination (number of lux). Thus, the total measurement time is reduced, which is the advantage of a powerful light source.

Each pixel in the hyperspectral image corresponds to a spherical direction in space to which the sample 20 reflects light. It then remains to match the spherical directions of observation ($\theta\_out$, $\varphi\_out$) to the pixels in the hyperspectral image.

As seen previously, for each angle of incidence of the light source 30, an acquisition must be made with the hyperspectral camera 50 of the dispersive screen 40 by replacing the material of the sample 20 to be measured with a dispersive material whose optical properties are known, in this case a piece of Spectralon. This therefore doubles the number of acquisitions required with the hyperspectral camera 50.

It is possible to perform a photometric or geometric calibration once, and then perform measurements on as many materials as desired, if the geometric configuration of the system does not change from one measurement to another. The precise robotic arms allow to reproduce the configurations from one material to another. Therefore, in the production phase, it is not necessary to redo a photometric calibration between two different materials.

Second Mode of Realization

In a second embodiment, the sample 20 is filmed with the hyperspectral camera 50.

For the geometric calibration, it is planned to use only an absolute geometric calibration in which the sample 20 is replaced by a reference optical element, which comprises a set of characteristic points whose position is known, for example a test pattern, in this case a black and white checkerboard pattern. The said reference optical element is then scanned with the hyperspectral camera 50 and a hyperspectral image is obtained by relative position of the reference optical element and the hyperspectral camera 50. Ambient illumination may suffice, it is not necessarily necessary to turn on the light source 30.

To determine the $\theta\_out$, $\varphi\_out$, x, y values, the corners of the checkerboard squares can be detected, for example, according to the Zhang method (described in Zhang, Z. (2000). "A flexible new technique for camera calibration". IEEE Transactions on pattern analysis and machine intelligence, 22(11), 1330-1334).

Indeed, the test pattern is positioned in place of the sample 20, which allows to determine the intrinsic (focal length, lens-induced deformation) and extrinsic (position and orientation) parameters of the hyperspectral camera 50 with respect to each pixel. From there, knowing the physical coordinates of the corners of the squares of the checkerboard in a reference frame linked to the sample 20, the detection of the pixels corresponding to these corners establishes the correspondence between x,y coordinates and u,v coordinates of the pixel in the image for each corner of the test pattern. An interpolation then allows to know the x,y for all the pixels of the hyperspectral image. Knowing the position and orientation of the hyperspectral camera 50 with respect to the test pattern as well as a model of the lens (obtained by Zhang's method) we then deduce the θ_out φ_out for each pixel in the hyperspectral image.

The values θ_in and φ_in are obtained by considering a model of the light source (origins and directions of a set of light rays coming from the source), each ray being incident on a point of the sample with a direction determined by the model, from which θ_in and φ_in can be deduced once the position and orientation of the light source 30 with respect to the sample 20 is known.

Thus one can have a geometric calibration that allows one to determine which pixel of the dispersive screen 40 corresponds to which direction of reflection of the sample 20.

Preferably one records in a correspondence table, the correspondence between each pixel u,v of the hyperspectral camera, and the values θ_in and φ_in; θ_out and φ_out; and x and y.

Alternatively, or in combination, a photometric calibration as described for the first embodiment may be implemented, wherein the reference material is advantageously also a piece of Spectralon. The relative positions of the reference material and the hyperspectral camera 50 are the same as the relative positions of the sample 20 to be characterized and the hyperspectral camera 50.

A set of hyperspectral images of the reference material is then produced. For each pixel, the spectrum obtained must be equal to rho/pi. A correspondence table is thus obtained, in this case a table of mutliplicative coefficients, wavelength by wavelength and pixel by pixel, which is then applied to the sample 20 to be characterized, as described previously.

In the second embodiment, shown in FIG. 3, the hyperspectral camera 50 is configured to directly scan the sample 20, and provides access to the portion of light reflected from the sample material 20 to it.

In this embodiment, the sample 20 is preferably positioned vertically, so that it can be viewed at the widest possible solid angle by the hyperspectral camera 50.

In a second variant of the second embodiment, the sample 20 and a so-called "compensating" dispersive screen are filmed with the hyperspectral camera 50, preferably simultaneously, the compensating dispersive screen being arranged on a sample holder (not illustrated) comprising at least two compartments, one compartment comprising the sample 20 and another compartment comprising the compensating dispersive screen, the two compartments being coplanar and allowing height adjustment such that the upper surfaces of the sample 20 and the compensating dispersive screen are coplanar.

Preferably, the dimensions of the dispersive compensating screen are less than or equal to those of the sample 20.

The operating principle is then to take a set of shots by the hyperspectral camera of the sample holder equipped with the compensating dispersive screen in one compartment and the dispersive screen 40 in the other compartment, then to take a set of shots by the hyperspectral camera of the sample holder equipped with the compensating dispersive screen in one compartment and the sample 20 in the other compartment.

The sample holder is configured so that the dispersive compensating screen and the sample 20 are visible simultaneously in the field of view of the hyperspectral camera, so that the dispersive compensating screen is visible for each analysis column of the sample 20.

The sample holder is also configured so that the light source 30 illuminates both the sample 20 and the compensating dispersive screen. Advantageously, the incident light beam from the light source 30 is wide, i.e. has a width greater than a predetermined threshold value. Preferably, the luminous flux produced by the light source 30 is high, i.e. its value is greater than a predetermined threshold value.

The compensating dispersive screen is of the same type, and preferably identical to the dispersive screen 40 used for calibration.

We can thus perform a differential radiometric calibration, i.e. calculate the average spectrum, for a column of the hyperspectral image, of the pixels corresponding to the compensating dispersive screen. This is done for the image where the sample 20 is filmed, and for the image where the dispersive screen 40 is filmed instead of the sample 20.

The comparison of these two average spectra allows the calculation of a corrective spectral vector for the column of the image corresponding to the sample, in order to return to virtually identical lighting conditions to those observed when the dispersive screen 40 is observed.

Thanks to this configuration, it is possible to compensate for any drift of the light source 30 and any drift of the hyperspectral camera.

For the geometric calibration variant using a reference mirror, the compensating dispersive screen can be used in the same way to compensate for the drift of the light source 30.

An absorbing filter may be provided that cuts off a portion of the light flux, so that the compensating dispersive screen receives all of the light flux emitted by the light source 30, but the sample 20 or mirror receives only a fraction of said light flux.

Performance

The performance of the device according to the invention is described below, with reference to the first or second embodiment.

Zenith Resolution

The zenith resolution is related to the sampling according to the viewing angle θ_out, which directly depends on the resolution of the hyperspectral camera 50 and its distance from the dispersive screen 40.

The angular resolution of human vision is close to 0.03°, which allows the eye to visualize the micro-defects of a surface and thus to differentiate materials from each other. It is therefore advantageous to achieve a zenith resolution of the order of 0.03°.

The hyperspectral camera 50 used in this case carries out acquisitions column by column, for example of 1080 or 2184 pixels. By acquiring the dispersive screen 40 with the hyperspectral camera 50 (1st implementation mode), an angular resolution of up to 0.03° can be obtained. This resolution allows the characterization of specular materials. A lower resolution may be sufficient for diffuse materials.

Azimuthal Resolution

The azimuthal resolution depends on the precision of the motorization system used by the hyperspectral camera 50.

It is advantageous to achieve an azimuthal resolution of the order of 0.1°.

Wavelength Resolution

The wavelength resolution depends on the spectral resolution of the hyperspectral camera 50. In this case, the camera used by the applicant has a wavelength resolution of 0.64 nm in the visible and near infrared band [400 nm; 1000 nm].

Exposure Time of the Hyperspectral Camera 50

The acquisition time of the light reflected from the sample 20 to the dispersive screen 40 depends on the acquisition speed of the hyperspectral camera 50 and the desired azimuth resolution.

The azimuthal resolution can be adaptive. It can vary according to the type of material to be characterized. It needs to be more precise for a specular material. The accuracy can be decreased for a diffuse material. An azimuthal resolution of 9° is sufficient for diffuse materials.

Measurement Time of BRDF and BTDF

For each angle of incidence of the light source 30, in order to calibrate the measurements, a first hyperspectral image with the material to be optically characterized and a second hyperspectral image with an optically known material, in this case the SpectraIon under the same lighting conditions, must be made. The measurement time of a BRDF or BTDF depends on the sampling used for the spherical directions of the incident light.

If 10 values of light source orientations 30 from 0° to 90° are considered, for example in steps of 10°, a BRDF can be measured in 2*2*10*10=400 seconds, or 6 minutes 40 seconds, for an isotropic sample 20, with:
- 2 for an acquisition with a high flux for the light source, and an acquisition with a low flux;
- 2 corresponding to 1 BRDF for sample 20 and 1 BRDF for the SpectraIon;
- 10 the number of values of incidence angle orientations, and
- 10 the measurement time in seconds of a hyperspectral acquisition of the dispersive screen 40 (for an acquisition of 10 000/15=667 columns of the scene which corresponds to a scanned angle of 67°, with an angular step of 0.1°)

This time is divided by two (i.e. 3 minutes 20 seconds) if the measurement has previously been performed for the SpectraIon.

If the material of the sample 20 is translucent, measurements are also performed with an orientation of the light source to the sample 20 between 90° and 180°.

As seen above, for 20 values of orientations of the incident light source 30, a BTDF can be measured in 2*2*20*10=800 seconds or 13 minutes 20 seconds.

Furthermore, it may be useful to consider the possible anisotropic character of the sample 20, because in the case of a rotation of the sample 20 in the incident plane, the appearance of said sample 20 is not modified if it is isotropic while it is modified if it is anisotropic.

Optical characterization of an anisotropic material, on the other hand, requires sampling the spherical directions of the light source 30 along $\varphi\_in$. This requires rotating the sample 20 to be measured about its normal, or alternatively changing the value of the angle $\varphi\_in$ by moving and rotating the light source. This rotation can be automated and 5 different orientations of the sample 20 to be characterized can be taken. It is then necessary to increase the number of acquisitions of the hyperspectral camera 50. The duration of the measurement of a BRDF with 10 angles of incidence of the light source 30 will in this case be 2*10*10*5 (anisotropic material)+2*10*10*5 (SpectraIon)=2000 seconds, i.e. 33 minutes 20 seconds. A BTDF with 10 angles of incidence of the light source 30 will be measured in 2*10*10*5 (anisotropic material)+2*10*10*5 (SpectraIon)=2000 seconds, or 33 minutes 20 seconds. A material that is both reflective and transmissive can be characterized by its BRDF and BTDF, which requires a total of 33 minutes 20 seconds (for BRDF) and 33 minutes 20 seconds (for BTDF) or 1 hour 06 minutes 40 seconds.

Calculations

Once the measurements have been made using the device according to the invention, it is then planned to reconstruct, i.e. calculate, a BRDF or a BTDF from said measurements according to the first or second embodiment as described below.

In the 1st embodiment.

In a purely illustrative example, a sample 20 of isotropic, non-translucent material is provided.

For example, 10 measurements are made from 10 respective positions of the light source 30 ($\theta\_in=5°$, $\theta\_in=10°$, $\theta\_in=20°$, $\theta\_in=30°$, $\theta\_in=40°$, $\theta\_in=45°$, $\theta\_in=50°$, $\theta\_in=60°$, $\theta\_in=70°$ and $\theta\_in=80°$). There are as many hyperspectral acquisitions with the sample 20 material to be optically characterized as with the reference material whose optical properties are known.

For each of the materials (sample 20 and reference) the number of hyperspectral images corresponds to the number of angles of incidence of the light source 30 illuminating the sample 20.

For each of these hyperspectral images, we look for the pixel with the most energy, i.e. the brightest, and we establish a correspondence between the hyperspectral image of the sample 20 and the hyperspectral image of the reference material, for the same angle of incidence.

According to the Snell-Descartes law, we know that a material tends to reflect light preferentially around the specularity peak corresponding to the symmetry of the light beam with respect to the tangent plane of the mirror at the point of incidence.

Thus, the pixel with the most energy corresponds to the angles of observation ($\theta\_out=\theta\_in$, e.g. 20°; and $\varphi\_out=\varphi\_in$, e.g. 0°). The hyperspectral image of the material corresponding to a source position at 20° from the normal to the sample 20 is analyzed.

This is performed for each hyperspectral image.

We then find the corresponding pixels ($\theta\_out=5°$, $\theta\_out=10°$, $\theta\_out=20°$, $\theta\_out=30°$, $\theta\_out=40°$, $\theta\_out=45°$, $\theta\_out=50°$, $\theta\_out=60°$, $\theta\_out=70°$, $\theta\_out=) 80°$.

From there, it is possible to interpolate the observation angles between 5° and 80° to find the remaining $\theta\_out$. The zenith accuracy can be 0.03°.

Similarly, it is possible to perform an extrapolation of the measurements.

In the 2nd embodiment

In the second embodiment, the measurements are performed using a goniometer and a collimated LED light source 30 that illuminates the sample material 20 to be optically characterized. Alternatively, the light source 30 can be dispersive along a cone, which allows for different $\theta\_in$ and $\varphi\_in$ on the sample 20, which is advantageous for example for a homogeneous sample, to have different $\theta\_in$ and $\varphi\_in$ from a single hyperspectral image.

Instead of scanning the dispersive screen 40 with the hyperspectral camera 50 as in the 1st embodiment, the latter here scans the sample 20 directly. The light emitted by the sample 20, i.e. reflected or transmitted by it, is thus directed directly towards the hyperspectral camera 50, i.e. without any prior reflection on the dispersive screen 40.

In this case, the sample 20 is illuminated by a light source 30 whose area of intersection with the sample 20 is greater than a predetermined threshold value. Thus, it is preferred to have a light spot at a light point.

The spectrum of the collimated light source 30 has energy across all wavelengths of the visible window. The light source has dimensions of, for example, 200 mm×200 mm and is preferably capable of delivering an illuminance of up to 30,000 lux.

Preferably, the sample 20 is arranged vertically, then illuminated by the light source 30 and then scanned by the hyperspectral camera 50.

This involves, for each pixel in the hyperspectral image, determining (θ_in, φ_in θ_out, φ_out, x, y), in accordance with the geometric calibration procedure described previously.

In a first step, a succession of acquisition of first hyperspectral images (scans) of the sample 20 by the hyperspectral camera 50 is performed.

In a second step, the said sample 20 is replaced by a dispersive screen 40 oriented exactly the same way as the sample 20, with a dimension greater than or equal to that of the sample, and a succession of acquisition of the second hyperspectral images (scans) of the said dispersive screen 40 is carried out with the same illumination conditions (same relative positions) as those of the sample 20.

Thus, for the same pixel of the hyperspectral image, we have on a first image: the image (first spectrum) of the light reflected by the sample 20 and on a second image, the image (second spectrum) of the light reflected by the dispersive screen 40, under the same lighting conditions (intensity, relative orientation).

Regardless of the first or second embodiment, the BRDF of said pixel can then be calculated by a known mathematical formula. In this case, the BRDF for wavelength λ is the value of the spectrum of the sample for wavelength λ*rho (the reflectance of the dispersive screen) for wavelength λ/pi/value of the spectrum of the dispersive screen 40 for wavelength λ.

Thus, for each pixel, and for a plurality of angles of incidence, the values θ_in, θ_out, φ_out, x, y, and λ are obtained; with x, y the coordinates of the sample points in a reference frame related to the sample, and λ the wavelength of the incident light beam 70 from the light source.

If the sample 20 is homogeneous, i.e., flat and uniform in color, then the points on the sample 20 all have the same BRDF. One can then reconstruct the BRDF of the entire sample 20 with relatively few hyperspectral images.

With a homogeneous sample 20, one can plan to implement a non-collimated (dispersive) light source, which allows the angle of incidence to be varied for a plurality of pixels in a single image, thus requiring fewer images than with a collimated source, thus being faster.

Each scene requires only one shot to determine multiple values of θ_in, φ_in and λ.

Similarly, if the sample 20 comprises a set of homogeneous areas, then the BRDF of the full sample 20 can be reconstructed by areas, assigning an identifier per area and a BRDF per area, which also allows the BRDF of the full sample 20 to be reconstructed with relatively few hyperspectral images.

With this configuration (hyperspectral camera observation+illumination of each point of the sample by an incident beam from a single direction), the result is equivalent to the illumination of the sample area defined by the apparent surface of the sample as seen by one pixel of the hyperspectral camera, thus avoiding the averaging of the first embodiment. This just requires ensuring that each point of the sample is illuminated by a single direction of light, which is the case with a collimated or point dispersive area source, but would not be the case with a dispersive area source.

If the sample 20 is non-homogeneous, for example because it includes a non-uniform color, pattern, or texture, then the points on the sample 20 do not all have the same BRDF.

In this case, it is advantageous to perform a BRDF classification based on the pixels of the texture, with all pixels of a given texture having the same point BRDF.

We can then also assign an identifier to each pixel, which refers to a point BRDF.

We thus obtain a global textured BRDF which is the collection of point BRDFs.

For a point BRDF, we can plan to determine the values θ_out, φ_out, which correspond to the maximum reflected energy. There is indeed, a correspondence between a pixel of the hyperspectral image and the sampled variables: θ_in, θ_out, φ_out, x, y, λ.

This correspondence is previously performed by a set of test patterns positioned in place of the sample 20, illuminated by the light source 30 and scanned by the hyperspectral camera 50. The space between the test patterns is known. On the hyperspectral images, it is then possible to determine the space between the pixels corresponding to the test patterns, which makes it possible to determine, for each pixel, the x,y coordinates of the corresponding point of the sample 20 in the reference frame of the sample 20.

Using the test patterns, it is also possible to determine the position and orientation of the hyperspectral camera 50 relative to the sample 20, which allows the determination of the θ_out, φ_out values for each pixel.

Alternatively, an interpolation step may be provided between the measured test pattern points.

The position and orientation of the collimated light source is known, so the values θ_in, φ_in are known. Since the values θ_in, φ_in are known and the values θ_out, φ_out are determined, the local normal to the sample 20 can then be calculated. This can be done by considering an analytical model of the BRDF (e.g. a Phong model) at each point on the sample 20, which must be oriented correctly in the direction of the normal to match the measured data, which is implemented by computer programming. Once the adjustment is made, we know the direction of the normal, so the microrelief of the sample by considering the different normals at the different points x,y corresponding to the pixels u,v of the hypespectral image.

For each image, the relative orientation of the sample 20, the hyperspectral camera 50 and the light source is then varied and a set of hyperspectral images is recorded for each new relative orientation.

Alternatively, as in the first embodiment, the hyperspectral camera 50 may be equipped with a polarizing filter.

It is thus possible to follow, from hyperspectral image to hyperspectral image, the possible variation in position of a pixel corresponding to a given physical point of the sample 20, including with polarized light.

Thanks to this configuration, the invention allows in particular the analysis of surfaces, for example telescope mirrors.

Regardless of the embodiment, it can be foreseen that the relative movements are controlled by a computer.

The invention is not limited to the previously described embodiments. For example, the hyperspectral camera 50 can be replaced by a monochromatic camera equipped with a set of interchangeable monochromatic filters, but at the cost of a higher operation time.

The present invention allows a combined spectral measurement with "out-of-plane" configuration, i.e. for incident and reflected/transmitted beam directions not in the same plane. The invention also allows a textured measurement with a fine resolution, which allows the characterization of paint flakes, which is useful in particular in the automotive or building industry. It is also possible to characterize translucent materials and to obtain measurements of normal maps; all in an operational time, that is to say a measurement time of BRDF and BTDF very satisfactory.

NOMENCLATURE 10 sample holder/sample support
20 sample
30 light source
40 dispersive screen
50 hyperspectral camera
51 hyperspectral camera field of view
60 arch of a goniophotometer
70 incident light beam from the light source
80 incident light beam reflected by the sample
90 light beam 80 reflected by the dispersive screen towards the hyperspectral camera
100 cell
110 first articulated arm
120 second articulated arm.

We claim:

1. An optical device for measuring optical properties of materials including at least one of reflected light (BRDF) and transmitted light (BTDF) from the material of a sample in all spherical directions of space around said sample, for each spherical direction of incident light, the device comprising:
a light source,
a goniophotometer configured to measure at least one of:
the directions of the incident light in spherical coordinates, and
the directions of the reflected light in spherical coordinates; and
a multi-sensor imaging device, configured to determine the emission spectrum of incident light from a set of points in the scene observed by the multi-sensor imaging device over a set of layers,
wherein the goniophotometer is comprised of a cell, said cell comprising:
a first articulated arm in three dimensions of space and configured to support the light source; and
a second articulated arm in three dimensions of space and configured to support the sample or a sample holder; and
wherein relative orientations of the first articulated arm and the second articulated arm are controllable.

2. The device of claim 1, further comprising a dispersive screen, the position and spatial orientation of which is adjustable.

3. The device of claim 2, further comprising:
a memory comprising at least one of:
a first correspondence table comprising a correspondence between a coordinate point of a specularly reflecting element disposed in place of the sample during a geometric calibration step, and its reflection on the dispersive screen, for a plurality of incidences;
a second look-up table, comprising multiplicative coefficients calculated after a photometric calibration; and
a third mapping table comprising a correspondence between a pixel of coordinates, the hyperspectral camera, and corresponding values,
wherein the cell is comprised of at least one of:
a scanning laser, configured to, upon detection of presence, inhibit at least one of the light source, the first articulated arm, and the second articulated arm; and
a polarizing filter, integral with the light source or the multi-sensor imaging device, and whose polarization axis is variable.

4. The device according to claim 2, wherein the dispersive screen comprises a fluoropolymer coating that has high Lambertian reflection.

5. The device, according to claim 1, wherein the optical device is configured so that the scene observed by the multi-sensor image-taking device is:
either said dispersive screen
or the sample.

6. The device according to claim 1, wherein the light source is configured to emit an incident light beam having a circular cross-section with an equivalent diameter between 0.1 mm and 20 mm, modifiable, and which is capable of generating up to 1,000,000 lux.

7. The device according to claim 1, wherein the light source comprises:
a set of at least 3 adjacent LEDs, one of which emits white light, one of which emits deep red light and one of which emits violet light, to emit over the entire visible spectrum; or
several LEDs whose respective beams are mixed thanks to semi-reflective blades, wherein the light source is comprised of a system on chip.

8. The device according to claim 1, wherein the multi-sensor imaging device is a hyperspectral camera.

9. The device of claim 8, wherein the hyperspectral camera comprises a wavelength splitting device that allows spectral decomposition of incident or reflected light.

10. The device of claim 8, wherein the hyperspectral camera is configured to observe the dispersive screen or sample column by column and determine the spectrum, luminance, and radiance at each pixel of the hyperspectral image.

11. The device according to claim 1, further comprising a computer configured to compute for a set of points in a reference frame related to the sample at least one of:
a map of normals to the sample from values of incident light and values of reflected light; and
a textured global BRDF, which is the collection of point BRDFs, with each pixel in a texture of the sample being characterized by one of these point BRDFs.

* * * * *